United States Patent [19]

Gusenius

[11] Patent Number: 5,307,493
[45] Date of Patent: Apr. 26, 1994

[54] "C" PROGRAM SOURCE BLOCKER

[76] Inventor: Delmar J. Gusenius, 3743 W. Yorkshire Dr., Glendale, Ariz. 85308

[21] Appl. No.: 943,104

[22] Filed: Sep. 10, 1992

Related U.S. Application Data

[63] Continuation of Ser. No. 793,228, Nov. 8, 1991, abandoned, which is a continuation of Ser. No. 328,650, Mar. 27, 1989, abandoned.

[51] Int. Cl.$^5$ .............................................. G06F 15/62
[52] U.S. Cl. ..................... 395/700; 395/145; 364/225.3; 364/225.6; 364/DIG. 1
[58] Field of Search ................... 395/145, 700; 371/19; 364/200, 900

[56] References Cited

U.S. PATENT DOCUMENTS 4,860,204  8/1989  Gendron et al. ..................... 364/300
4,885,717  12/1989  Beck et al. ......................... 364/900

OTHER PUBLICATIONS

*Software Engineering*, Jensen, Randall W. and Charles C. Tonies, Prentice-Hall Inc.: Englewood Cliffs, N.J., 1979.
Shi-Kuo Chang, "Visual Languages: A Tutorial and Survey," IEEE Software, vol. 4, No. 1, Jan. 1987, pp. 29–39.
Ourston et al, Automatic Software Documentation Support: An Example of Machine Translation, IEEE Conf. on Systems Sciences, 1988, pp. 510–517.
Landis et al, Documentation in a Software Maintenance Environment, IEEE Conf. on Software Maintenance, 1988, pp. 66–73.
Nickerson, Fundamentals of Programming in BASIC, Little, Brown and Co., 1981, pp. 80–85.
Jensen et al, Software Engineering, Prentice-Hall, 1979, pp. 357–392.

Primary Examiner—Gareth D. Shaw
Assistant Examiner—Dennis M. Butler
Attorney, Agent, or Firm—J. S. Solakian; J. H. Phillips

[57] ABSTRACT

A programming tool for providing a graphical representation of the relationships among a plurality of nested blocks integrated into a processed "C" source code listing is disclosed. For each line of code including a "{" character, an outbound arrow is appended. Similarly, for each line of code including a "}" character, an inbound arrow is appended, and the inbound and outbound arrows are tabbed into vertical alignment. A "depth number" is developed for each line now having arrows by performing an increment when a line having an outbound arrow is encountered and a decrement for the starting depth number value of the next line when a given line having an inbound arrow is encountered. The depth numbers, and also one or more (as indicated by the depth number for a given line) right justified vertical line segments, are appended to the lines having outbound or inbound arrows. Intermediate lines have appended the same number of vertical line segments as the last arrowed line if it was outbound or one less than the last arrowed line if it was inbound. Then, horizontal line segment characters are entered in the spaces between the depth number and the leftmost vertical line segment in a given line having an outbound or inbound arrow.

4 Claims, 3 Drawing Sheets

```
main ( )
  {
  char ans [10]
  mistakes = 0
  printf ("This is only a test... \n");
  while (1)    {
    printf ("Enter one numeric digit:");
    gets (ans);
    if  ((ans[0] > '0') && (ans[0]) < '9') {
      printf ("Good stuff- grade A operator.\n");
      continue;
      }
    else  {
      printf ("We're starting to worry about you\n");
      mistakes ++;
      if (mistakes > 5) {
        printf ("Are you wearing gloves?\n");
        printf ("Max nbr goofs exceeded.\n");
        break;
        }
      }
    }
  return;
  }
```

*FIG. 1*

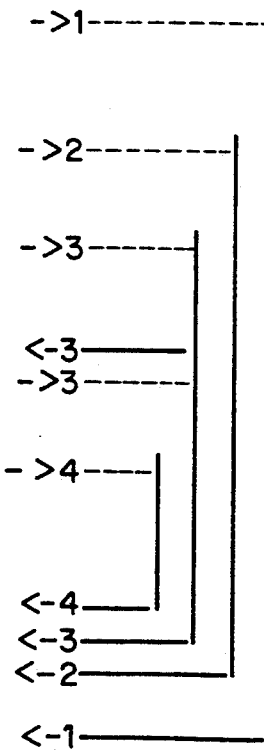

```
main ( )
  {
  char ans [10]
  mistakes = 0
  printf ("This is only a test... \n");
  while (1) {
    printf ("Enter one numeric digit ");
    gets (ans);
    if ((ans[0]>'0' && (ans[0])<'9'){
      printf ("Good stuff-grade A operator.\n");
      continue;
      }
    else  {
      printf("We're starting to worry about you\n");
      mistakes ++;
      if (mistakes > 5){
        printf ("Are you wearing gloves?\n");
        printf ("Max nbr goofs exceeded.\n");
        break;
        }
      }
    }
  return;
  }
```

*FIG. 5*

"C" PROGRAM SOURCE BLOCKER

This is a continuation of copending application Ser. No. 07/793,228 filed on Nov. 8, 1991, now abandoned, which is a continuation of copending application Ser. No. 07/328,650 filed on Mar. 27, 1989, now abandoned.

FIELD OF THE INVENTION

This invention relates to the art of computer programming and, more particularly, to a programming annotation tool which improves the comprehensibility of the source code listing of a program written in the C Language.

BACKGROUND OF THE INVENTION

As notoriously well known to those skilled in the art of computer programming, it is difficult to follow the structure and flow of a program from a study of the source code listing. Even in a review of one's own work, difficulties may be encountered if the program was written in the past such that its "philosophy" is not fresh in mind. But, it is particularly difficult to undertake the study of a source code listing of a program written partly or wholly by another person or persons since each programmer has his or her own style and thought process in writing programs. Further, it is a perhaps unfortunate fact that (because of productivity demands or even because of poor discipline) programs are no longer routinely subject to higher level documentation, such as by the preparation of detailed flow charts; consequently, the difficulty of following one's own program, let alone the work of others, is additionally aggravated.

One highly regarded programming language in wide use among both professional and amateur programmers is "C". Well written "C" programs often frequently employ code blocks which may be "nested" to several levels, or nested blocks of the source code listing, and it is troublesome, when examining a source code listing which may have been prepared in the past or by others, to determine the beginnings and ends of the code blocks and the levels of nesting. Those skilled in the art will appreciate that it would be highly desirable to provide, in a "C" source code listing, annotations which will assist the peruser of such in following the code blocking and nesting structure of the listed program, and it is to these ends that my invention is directed.

OBJECTS OF THE INVENTION

It is therefore a broad object of my invention to provide an annotation tool for source code listings to facilitate following the structure and sequence of a listed program.

It is another object of my invention to provide such a tool which is particularly applicable to employment in conjunction with listings in "C" source code.

It is a more specific object of my invention to provide an annotation tool for "C" source code listings which visually identifies each code block and the nesting relationship among all code blocks in a concise and easy to follow presentation.

SUMMARY OF THE INVENTION

Briefly, these and other objects of the invention are achieved by a programming tool a stored program, which when executed by a digital computer system causes the system to provide a graphical representation of the relationships among a plurality of nested blocks integrated into a processed "C" source code listing by first selecting a little used character (such as a tilde "~") in the source code language to be employed as a tabbing character and then substituting a dedicated string into the source code for the character selected. Next, for each line of code of the source code listing including a start of block "{" character, a tilde and an outbound arrow (which can be simulated by a hyphen followed by a "greater than" character) are appended. Similarly, for each line of code including an end of block "}" character, a tilde and an inbound arrow (which can be simulated by a "less than" character followed by a hyphen) are appended. Using the tilde as a tabbing character, the inbound and outbound arrows are tabbed into vertical alignment. Next, while sequentially examining the partly processed source code from the first line, a "depth number" is developed for each line now having an inbound or outbound arrow by performing a depth number increment when a line having an outbound arrow is encountered, and when a given line having an inbound arrow is encountered, performing a depth number decrement for the depth number value of the next line having a tilde below said given line. The depth numbers, and also one or more (as indicated by the depth number for a given line) right justified vertical line segments, are appended to the lines having outbound or inbound arrows. Each intermediate line, a line of the source code to which neither an inbound nor an outbound arrow is appended, has appended to it the same number of vertical line segments as the first arrowed line above it, if that arrowed line has an outbound arrow; and has appended to it the same number of vertical line segments as the first arrowed line above it, decremented by one, if that arrowed line has an inbound arrow. Then, horizontal line segment characters are entered in the spaces between the depth number and the leftmost, or nearest, vertical line segment in a given line having an outbound or inbound arrow. Preferably, for best visual appearance and clarity, the horizontal characters entered between the depth number and the leftmost vertical line segment in lines having outbound arrows are hyphen characters, and the horizontal characters entered between the depth number and the leftmost vertical line segment in lines having inbound arrows are underscore characters.

DESCRIPTION OF THE DRAWING

The subject matter of the invention is particularly pointed out and distinctly claimed in the concluding portion of the specification. The invention, however, both as to organization and method of operation may best be understood by reference to the following description taken in conjunction with the subjoined claims and the accompanying drawing of which:

FIG. 1 is an exemplary brief "C" source code listing as it normally appears;

FIG. 5 is a listing of the "C" program of FIG. 1 after it has been processed by the subject blocker program to provide the sought after code block identification and nesting annotations.

DETAILED DESCRIPTION OF THE INVENTION

Referring to FIG. 1, a simple, exemplary "C" program is listed in source code. While elementary, this program listing employs several code blocks, or blocks of code, and several layers of nesting of such blocks of code such that it is not at all easy to follow upon first inspection, particularly if the program has been written by another or sufficiently in the past that the peruser/programmer has forgotten his/her approach to writing the program. It is therefore desirable to process the exemplary program in accordance with the subject program blocker invention to produce a graphically enhanced visual display of the program listing.

Figure 2:
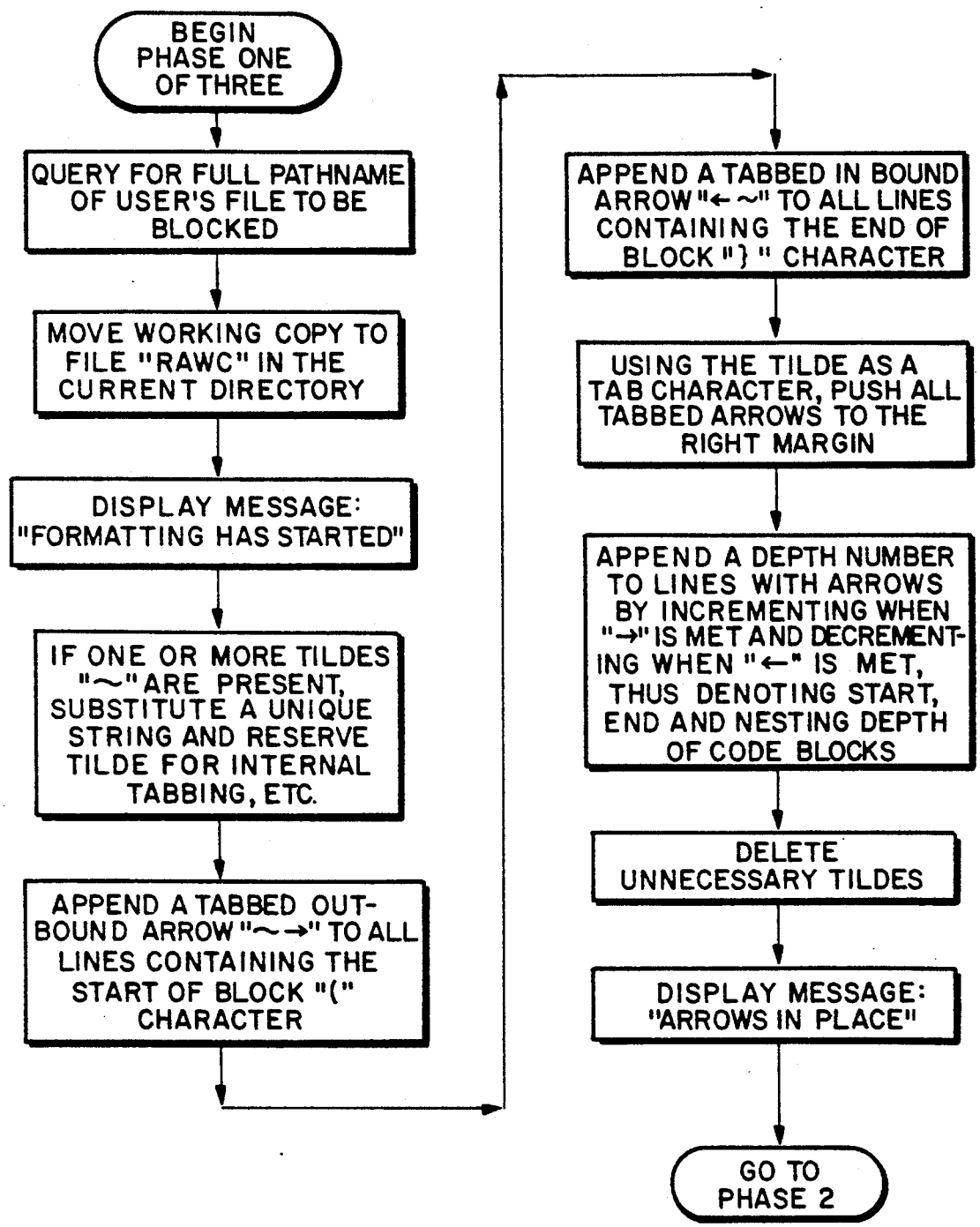
FIG. 2 is a flow chart illustrating the sequence of processing the "C" program of FIG. through a first phase of the subject blocker program.

The program blocker invention, in its presently preferred embodiment, has a three pass structure, and FIG. 2 is a flow chart of Phase One. On beginning the blocker program, a query is presented for the full pathname of the "C" program to be blocked; i.e., its present location in storage. A working copy of the "C" program source listing is obtained (in read-only mode for safety) and stored in file ".rawc." in the current directory; i.e., the directory in which the subject blocker program is located. The file .rawc. is then loaded into random access memory ("RAM") to begin the actual processing, and a message "FORMATTING HAS STARTED" is displayed.

Each line of the "C" program source code is examined in turn. If a tilde "~" is present in one or more instances, a unique string of characters (selected to represent the tilde) is substituted for each occurrence. This permits the tilde itself to be reserved for internal tabbing, etc. during execution of the blocker program as will become more clear below. Those skilled in "C" programming will understand that the tilde is one of the least used operators in "C" and was selected for that reason in the example; however, any other seldom used operator could be selected for the special purpose requirement in the subject blocker program.

Each line is then examined for the presence of the "{" character which indicates "start of block" in "C". If the "}" character is present in a given line, a tabbed outbound arrow "~>" (i.e., a tilde followed by a hyphen and a "greater than" character) is appended to that line of the source code listing. Similarly, each line of the source code listing is next examined for the presence of the "}" character which indicates "end of block", and if present, a tabbed inbound arrow "~<" (a tilde followed by a "less than" character and a hyphen) is appended to that line of the listing. A line of code of the source code listing that includes both the start of a block character and the end of a block character is ignored, i.e.; such a line of code does not have appended to it either a tilde or an arrow. Then, interpreting each tilde as a tab character, the inbound and outbound arrows are pushed to the current right margin to establish a "beach head" at the right side.

Next, a "depth number" is appended to each line now having inbound and outbound arrows at the right margin. The depth number for each such line is obtained by performing a depth number increment when a line having an outbound arrow ">" is encountered and performing a depth number decrement for the starting depth number value of the next line having an outbound or an inbound arrow below a given line having an inbound arrow "<". The depth numbers thus serve to denote the start, end and nesting depth of the code blocks.

As a housekeeping function, the now unnecessary tildes are deleted. (It may be noted, however, that the tilde remains available for use in the blocker program since the selected unique string is still in place.) A message "ARROWS ARE IN PLACE" is then displayed, and Phase Two of the blocker program may be entered.

Figures 3, 4:
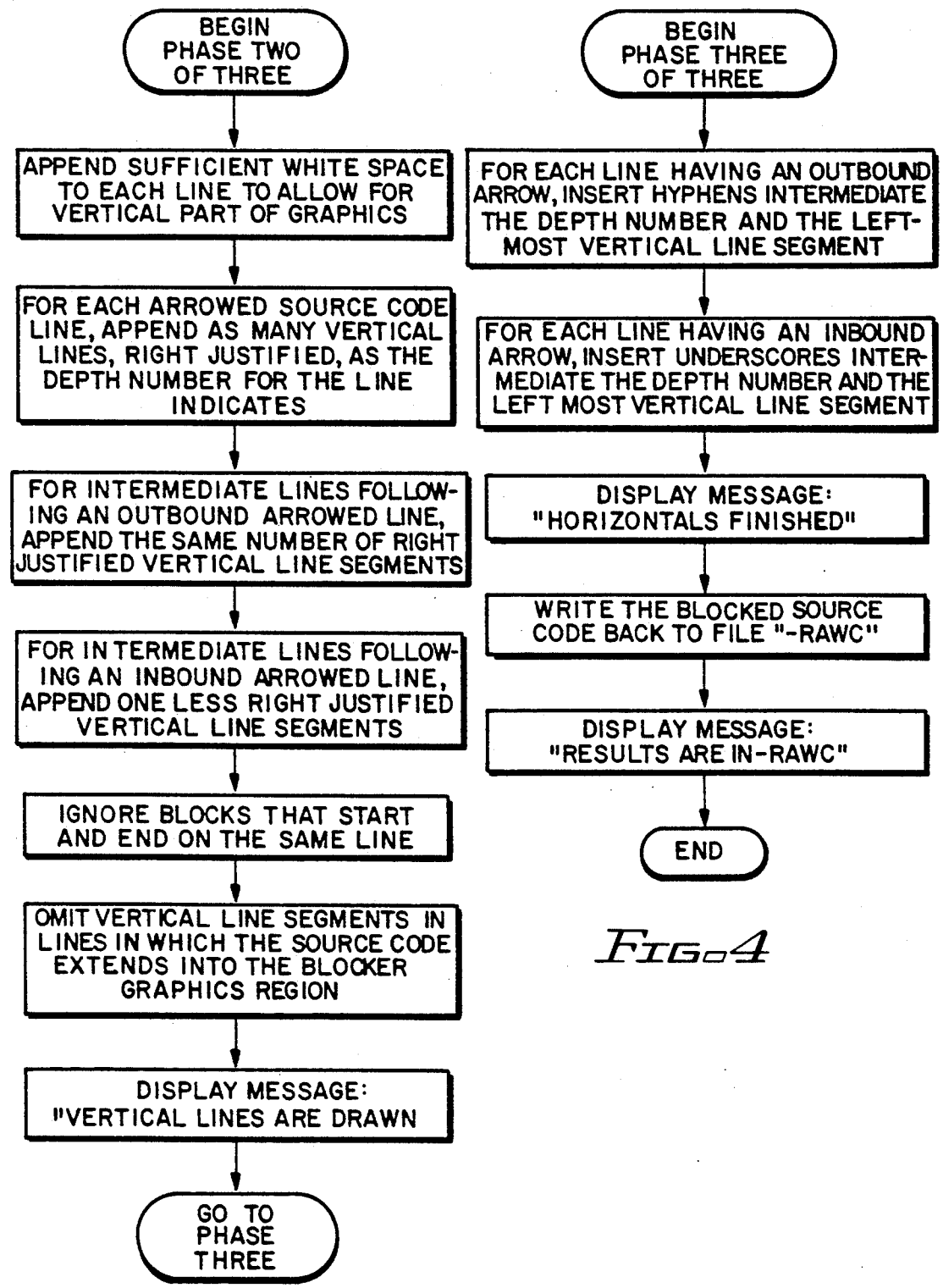
FIG. 3 is a flow chart illustrating the sequence of processing the "C" program of FIG. 1 through a second phase of the subject blocker program.
FIG. 4 is a flow chart illustrating the sequence of processing the "C" program of FIG. 1 through a third phase of the subject blocker program.

Referring to FIG. 3, there is appended to each line of code sufficient "white space" to accommodate the vertical part of the blocker graphics and, for arrowed lines, as many vertical line segments as the depth number indicates are appended. Intermediate lines have appended the same number of vertical line segments as the last arrowed line if it was outbound or one less than the last arrowed line if it was inbound. In the presently preferred embodiment, adjacent vertical lines are preferably separated by a blank space for aesthetic and clarity purposes. For example, (assuming a maximum accommodation of seven deep nesting and at least two spaces between an arrow and a vertical line) if a line having an ">6" is examined, four spaces and six horizontally spaced vertical lines (separated by intervening single spaces) are appended. If the immediately following line has no arrow appended, it will also have four spaces and six horizontally spaced vertical lines appended. However, if a line of the source code listing has an "<5" entry, six spaces and five horizontally spaced vertical lines are appended. Thus, it is important to note that the group of vertical lines associated with each line of source code are oriented by this operation so that they are appended in a right justified manner whereby all vertical line segments are vertically aligned. In this process, blocks which start and end on the same line are ignored. In addition, for unusually long lines of source code which extend into the area of the vertical graphics, no vertical lines are entered since the eye can readily follow the vertical flow of the graphics "through" such long lines.

At this point the message "VERTICALS LINES DRAWN" is displayed, the again unnecessary tildes are removed and Phase 3 of the blocker program is entered. The purpose of Phase 3, as will be apparent from FIG. 4, is to emplace the horizontal components of the blocker graphics. This task is readily achieved by employing a sufficient number of global replacement passes to equal twice the nesting depth accommodated (which is seven in the presently preferred embodiment). During the first series of global passes, the hyphen character is substituted for each space appearing between each outbound arrow and the first vertical line to its right. Then, the second series of global passes serves to replace each space appearing between each inbound arrow and the first vertical line to its right with an underscore character; i.e., "$_{13}$". (The selection of the underscore character for this purpose is simply for improved appearance and clarity.) The message "HORIZONTALS ARE FINISHED" is then displayed, the blocked source code is stored back to file ".rawc", and a message to that effect ("OUTPUT IS WAITING IN .RAWC") is displayed.

The exemplary "C" source program illustrated in FIG. 1 may now be viewed as shown in FIG. 5 with the blocking graphics in place. Those skilled in the art will immediately recognize the dramatic improvement in clarity and comprehension which processing the listing through the subject blocker tool has obtained. It will also be apparent from a study of FIG. 5 why the vertical lines are, in effect, right justified; i.e., a given block at a given depth wraps to the right of the next higher numbered block and t the left of the next lower numbered block such that the block with depth number 1 has 5 vertical lines at the rightmost position. This configuration tends to follow the "mental picture" which "C" programmers intuitively try to form in following code block relationships.

Thus, while the principles of the invention have now been made clear in an illustrative embodiment, there will be immediately obvious to those skilled in the art many modifications of program structure and arrangements used in the practice of the invention which are particularly adapted for specific environments and operating requirements without departing from those principles.

I claim:

1. A method for annotating a computer program having nested blocks of source code, with each block of source code of the program to be annotated including one or more lines of the source code, each line of the source code having an end and a right margin, the end of a line of the source code and its right margin defining a white space therebetween, the right margins of the lines of the source code being aligned vertically; and each block of the source code of the program to be annotated having a beginning and an ending, said program to be annotated being written in a computer programming language which includes characters, with the beginning of each block of source code to be annotated being identified by a first unique character and the ending of each block of source code being identified by a second unique character, said method being executed by a digital computer system controlled by a stored program; said method comprising the digital computer system under the control of said stored program performing the steps of:

A) appending a special tabbing character and an outbound arrow within the white space of each line of the source code which includes one of said first unique characters, and appending the special tabbing character and an inbound arrow within the white space of each line of the source code listing which includes one of said second unique characters, a line of the source code to which an arrow is appended in Step A), hereafter identified as an arrowed line; and appending neither a special tabbing character nor an inbound or an outboard arrow to a line of the source code listing which includes both of said unique characters, nor to a line of the source that does not contain either one of said first or second unique characters; a line of the source code to which neither a special tabbing character nor an arrow is appended in step A), hereafter being identified as an intermediate line;

B) moving the special tabbing characters and inbound and outbound arrows of the arrowed lines into vertical alignment;

C) appending a depth number within said white space of each arrowed line of the source code adjacent is arrow, and vertically aligning said depth numbers, the value of each depth number being determined as follows;

1) the first arrowed line having an outbound arrow being assigned a depth number of one;
2) the depth number of an arrowed line having an outbound arrow which is below an arrowed line having an outbound arrow being assigned the depth number of the first arrowed line having an outbound arrow above it, incremented by one;
3) the depth number of an arrowed line having an inbound arrow which is below an arrowed line having an outbound arrow being assigned the depth number of the first arrowed line having an outbound arrow above it;
4) the depth number of an arrowed line having an inbound arrow which is below an arrowed line having an inbound arrow being assigned the depth number of the first arrowed line having an inbound arrow above it, decremented by one; or
5) the depth number of an arrowed line having an outbound arrow which is below an arrowed line having an inbound arrow being assigned the depth number of the first arrowed line having an inbound arrow above it, D) examining each line of said source code listing and appending uniformly spaced apart vertical line segment characters to each arrowed line beginning at the right margin of said line, the number of vertical line segments appended to each such arrowed line equaling the depth number appended thereto in Step C); each intermediate line below an arrowed line having an outbound arrow, having appended thereto, beginning at the right margin thereof, the number of vertical line segments appended to the first arrowed line having an outbound arrow thereabove; and each intermediate line of the source code listing below an arrowed line having an inbound arrow, having appended thereto, beginning at the right margin thereof, the number of vertical lines segments appended to the first arrowed line having an inbound arrow immediately thereabove decremented by one;

E) appending horizontal line segment characters between the depth number of an arrowed line and the nearest vertical line segment character appended to said line in step D).

2. The method of claim 1 which is further characterized by the special tabbing character appended in step A) being a tilde, "~", an outbound arrow being simulated by a hyphen character followed by a greater than character, and an inbound arrow being simulated by a less than character followed by a hyphen character.

3. The method of claim 2 which is further characterized by, in step E), the horizontal line segments appended by the digital computer system to each of the lines of source code listing which include the first unique character being different than the horizontal line segments appended to the lines of the source code which include the second unique character.

4. The method of claim 3 in which the source code of the program to be annotated is written in C Language.

* * * * *